(12) United States Patent
Chuang et al.

(10) Patent No.: US 11,595,656 B2
(45) Date of Patent: Feb. 28, 2023

(54) METHOD AND APPARATUS OF TRANSFORM COEFFICIENT CODING WITH TB-LEVEL CONSTRAINT

(71) Applicant: MEDIATEK INC., Hsinchu (TW)

(72) Inventors: Tzu-Der Chuang, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/424,639

(22) PCT Filed: Jan. 22, 2020

(86) PCT No.: PCT/CN2020/073877
§ 371 (c)(1),
(2) Date: Jul. 21, 2021

(87) PCT Pub. No.: WO2020/151753
PCT Pub. Date: Jul. 30, 2020

(65) Prior Publication Data
US 2022/0094939 A1 Mar. 24, 2022

Related U.S. Application Data

(60) Provisional application No. 62/824,467, filed on Mar. 27, 2019, provisional application No. 62/822,771, (Continued)

(51) Int. Cl.
*H04N 19/13* (2014.01)
*H04N 19/105* (2014.01)
(Continued)

(52) U.S. Cl.
CPC .......... *H04N 19/13* (2014.11); *H04N 19/105* (2014.11); *H04N 19/176* (2014.11); *H04N 19/18* (2014.11)

(58) Field of Classification Search
CPC .... H04N 19/13; H04N 19/105; H04N 19/176; H04N 19/18; H04N 19/16; H04N 19/129;
(Continued)

(56) References Cited

U.S. PATENT DOCUMENTS 9,462,275 B2  10/2016  Guo et al.
10,021,420 B2 *  7/2018  Lee .......... H04N 19/61
(Continued)

FOREIGN PATENT DOCUMENTS

BR  112021011060 A2 *  8/2021  .......... H03M 7/40
CN  104081777 A  10/2014
(Continued)

OTHER PUBLICATIONS

Detlev Marpe et al., "Context-Based Adaptive Arithmetic Coding in the H.264/AVC Video Compression Standard" © 2003 IEEE; 1051-8215/03 (Year: 2003).*
(Continued)

*Primary Examiner* — Dramos Kalapodas
(74) *Attorney, Agent, or Firm* — McClure, Qualey & Rodack, LLP

(57) ABSTRACT

A method and apparatus for encoding or decoding transform coefficients in a video coding system are disclosed. According to this method, a region after zero-out is determined. A remaining number of context-coded bins is determined for the current TB based on a size of the region after zero-out. The current TB is encoded or decoded using context-based coding with a constraint based on the remaining number of context-coded bins. According to another method, a remaining number of context-coded bins is determined for the current TB based on the last significant CG index.

9 Claims, 5 Drawing Sheets

Related U.S. Application Data filed on Mar. 22, 2019, provisional application No. 62/813,208, filed on Mar. 4, 2019, provisional application No. 62/802,139, filed on Feb. 6, 2019, provisional application No. 62/796,611, filed on Jan. 25, 2019.

(51) Int. Cl.
*H04N 19/176* (2014.01)
*H04N 19/18* (2014.01)

(58) Field of Classification Search
CPC .... H04N 19/625; H04N 19/132; H04N 19/70; H04N 19/46
See application file for complete search history.

(56) References Cited

U.S. PATENT DOCUMENTS

| | | | |
|---|---|---|---|
| 11,128,866 B2 * | 9/2021 | Karczewicz | H04N 19/44 |
| 2013/0058407 A1 * | 3/2013 | Sole Rojals | H04N 19/129 |
| | | | 375/240.12 |
| 2013/0182757 A1 * | 7/2013 | Karczewicz | H04N 19/60 |
| | | | 375/240.18 |
| 2013/0272377 A1 * | 10/2013 | Karczewicz | H03M 7/30 |
| | | | 341/51 |
| 2014/0003533 A1 * | 1/2014 | He | H04N 19/91 |
| | | | 375/240.01 |
| 2016/0277765 A1 | 9/2016 | Schwarz et al. | |
| 2020/0213596 A1 * | 7/2020 | Xu | H04N 19/149 |
| 2020/0213606 A1 * | 7/2020 | Li | H04N 19/70 |
| 2020/0236403 A1 * | 7/2020 | Choi | H04N 19/91 |
| 2021/0203933 A1 * | 7/2021 | Rosewarne | H04N 19/13 |
| 2021/0211729 A1 * | 7/2021 | Koo | H04N 19/132 |
| 2021/0243443 A1 * | 8/2021 | Choi | H04N 19/60 |
| 2021/0274185 A1 * | 9/2021 | Yoo | H04N 19/13 |
| 2021/0329284 A1 * | 10/2021 | Bossen | H04N 19/18 |
| 2021/0337206 A1 * | 10/2021 | Choi | H04N 19/18 |
| 2021/0368176 A1 * | 11/2021 | Bross | H04N 19/46 |
| 2021/0409716 A1 * | 12/2021 | Choi | H04N 19/176 |

FOREIGN PATENT DOCUMENTS

| | | | | |
|---|---|---|---|---|
| EP | 2 592 832 A2 | 5/2013 | | |
| EP | 2592832 A2 * | 5/2013 | ........... | H04N 19/176 |
| JP | 2003-153228 A | 5/2003 | | |
| WO | 2013/022748 A1 | 2/2013 | | |

OTHER PUBLICATIONS

Iain Richardson : "Context-Based Adaptive Arithmetic Coding (CABAC) H.264/MPEG-4"; Oct. 17, 2002 (Year: 2002).*
International Search Report and Written Opinion dated Apr. 22, 2020, issued in application No. PCT/CN2020/073877.
Chinese language office action dated Apr. 16, 2021, issued in application No. TW 109102603.

* cited by examiner

METHOD AND APPARATUS OF TRANSFORM COEFFICIENT CODING WITH TB-LEVEL CONSTRAINT

CROSS REFERENCE TO RELATED PATENT APPLICATION(S)

The present invention claims priority to U.S. Provisional Patent Application, Ser. No. 62/796,611 filed on Jan. 25, 2019, U.S. Provisional Patent Application, Ser. No. 62/802,139 filed on Feb. 6, 2019, U.S. Provisional Patent Application, Ser. No. 62/813,208 filed on Mar. 4, 2019, U.S. Provisional Patent Application, Ser. No. 62/822,771 filed on Mar. 22, 2019 and U.S. Provisional Patent Application, Ser. No. 62/824,467 filed on Mar. 27, 2019. The U.S. Provisional Patent Applications are hereby incorporated by reference in their entireties.

TECHNICAL FIELD

The present invention relates to transform coding of prediction residuals in a video encoder or decoder. In particular, the present invention discloses methods to reduce the complexity for syntax coding of transform coefficients using context-based entropy coding with bypass mode.

BACKGROUND

The High Efficiency Video Coding (HEVC) (Rec. ITU-T H.265|ISO/IEC 23008-2 version 3: High efficiency video coding, April, 2015) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into non-overlapped square block regions represented by coding tree units (CTUs). A coded picture can be represented by a collection of slices, each comprising an integer number of CTUs. The individual CTUs in a slice are processed in a raster scanning order. A bi-predictive (B) slice may be decoded using Intra prediction or inter prediction using at most two motion vectors and reference indices to predict the sample values of each block. A predictive (P) slice is decoded using Intra prediction or inter prediction using at most one motion vector and reference index to predict the sample values of each block. An Intra (I) slice is decoded using Intra prediction only.

FIG. 1A illustrates an exemplary adaptive Inter/Intra video coding system incorporating loop processing. For Inter/Intra prediction block 110 generates prediction signal using Inter or Intra prediction adaptive for each coding block (e.g. a CU). The Inter prediction signal may use the current block from the Input video and one or more reference pictures from the Frame Buffer 134 to derive motion estimation. On the other hand, the Intra prediction signal uses the current block from the Input video and neighboring blocks of the currently reconstructed picture from the reconstruction block (REC) 128 to derive Intra prediction signal. The prediction signal is subtracted from the original signal using the subtract or 116 to generate the residual signal. The residual signal is then processed by transform block (T) 118 and quantization block (Q) 120 to generate quantized-transformed residual (i.e., quantized coefficients), which is further processed by Entropy encoder 122 to be included in the output bitstream. At the encoder side, when an Inter-prediction mode is used, a reference picture or pictures have to be reconstructed at the encoder end as well. When an Intra mode is used, the reconstructed neighboring blocks will be used. Therefore, an Intra coded block needs to be reconstructed for later use by subsequent blocks coded in the Intra mode. Consequently, the transformed and quantized residues are processed by Inverse Quantization (IQ) 124 and Inverse Transformation (IT) 126 to recover the residues. The reconstructed residues are then added back to prediction signal by the REC 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, Deblocking filter (DF) 130 is often applied to the reconstructed video data before the reconstructed video data are stored in the Frame Buffer 134 in order to improve video quality. Beside deblocking filter, other loop filters (referred as Non-deblocking filters, NDFs) 132, such as Sample Adaptive Offset (SAO) may be used. The system in FIG. 1A is intended to illustrate an exemplary structure of a typical video encoder.

FIG. 1B illustrates a corresponding decoder structure, where most blocks are already used in the encoder. However, at the decoder side, an Entropy Decoder 140 is used instead of the Entropy Encoder 122. Furthermore, the Inter/Intra Prediction Block 150 for the decoder side is different from that at the encoder side since the motion compensation is performed at the decoder side.

A CTU can be partitioned into multiple non-overlapped coding units (CUs) using the recursive quadtree (QT) structure to adapt to various local motion and texture characteristics. One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with other side information are entropy coded in the bitstream. FIG. 2 illustrates an example of the block partitioning 210 and its corresponding QT representation 220. The solid lines indicate the CU boundaries and the dashed lines indicate the TU boundaries.

The terms coding tree block (CTB), coding block (CB), prediction block (PB), and transform block (TB) are defined to specify the 2-D sample array of one color component associated with CTU, CU, PU and TU, respectively. A CTU consists of one luma CTB, two chroma CTBs, and associated syntax elements. A similar relationship is valid for CU, PU and TU. The tree partitioning is generally applied simultaneously to both luma and chroma, although exceptions apply when certain minimum sizes are reached for chroma.

Joint Video Expert Team (JVET) of ITU-T SG16 WP3 and ISO/IEC JTC1/SC29/WG11 are currently in the process of establishing the next-generation video coding standard. Some promising new coding tools have been adopted into Versatile Video Coding (VVC) Working Draft (WD) 2 (B. Brossey et al., "Versatile Video Coding (Draft 2)," Joint Video Expert Team (JVET) of ITU-T VCEG (Q6/16) and ISO/IEC MPEG (JTC 1/SC 29/WG 11), Doc. JVET-K1001, 11th Meeting: Ljubljana, SI, 10-18 Jul. 2018). In VVC WD 2 (i.e., JVET-K1001), each coding tree unit (CTU) can be partitioned into one or more smaller-size coding units (CUs) by a quadtree with nested multi-type tree using binary and ternary split. The resulting CU partitions can be in square or rectangular shapes.

In HEVC (Rec. ITU-T H.265|ISO/IEC 23008-2 version 3: High efficiency video coding, April, 2015) and VCC WD 2 as specified in JVET-K1001 (B. Bross, J. Chen, S. Liu, "Versatile Video Coding (Draft 2)," Joint Video Expert Team (JVET) of ITU-T VCEG (Q6/16) and ISO/IEC MPEG (JTC 1/SC 29/WG 11), Doc. JVET-K1001, 11th Meeting: Ljubljana, SI, 10-18 Jul. 2018), the coded block flag (CBF) is utilized to signal if there is any non-zero transform coefficient in a transform block. When the CBF is equal to 0, the associated transform block is not further coded and all the coefficients in the current transform block are inferred to be equal to 0. Otherwise, the associated transform block contains at least one nonzero transform coefficient. A nonzero transform block is further divided into non-overlapped sub-blocks. A syntax element, coded_sub_block_flag may be signaled to indicate whether a current subblock contains any nonzero coefficient. When coded_sub_block flag is equal to 0, the associated transform subblock is not further coded and all the coefficients in the current transform subblock are inferred to be equal to 0. Otherwise, the associated transform block contains at least one non-zero transform coefficient. The values of the transform coefficient levels in the associated subblock are entropy coded using multiple subblock coding passes. In each coding pass, the individual transform coefficients are visited once according to a pre-defined scanning order.

In HEVC, a syntax element, sig_coeff_flag is signaled in the first subblock coding pass to indicate whether the absolute value of a current transform coefficient level is greater than 0. A syntax element, coeff_abs_level_greater1_flag is further signaled in the second coding pass for a current coefficient with sig_coeff flag equal to 1 to indicate whether the absolute value of the associated transform coefficient level is greater than 1. A syntax element, coeff_abs_level_greater2_flag is further signaled in the third coding pass for a current coefficient with coeff_abs_level_greater1_flag equal to 1 to indicate whether the absolute value of the associated transform coefficient level is greater than 2. The sign information and the remaining level values are further signaled by syntax elements, coeff_sign_flag and coeff_abs_level_remaining in the fourth coding and fifth subblock coding passes, respectively.

In VCC WD 2 as specified in JVET-K1001, the transform coefficients may be quantized by dependent scalar quantization. The selection of one of the two quantizers is specified by a state machine with four states. The state for a current transform coefficient is determined by the state and the parity of the absolute level value for the preceding transform coefficient in scanning order. The syntax elements, sig_coeff_flag, par_level_flag and rem_abs_gt1_flag are signaled in the first subblock coding pass. The partially reconstructed absolute value of a transform coefficient level from the first pass is given by:

AbsLevelPass1=sig_coeff_flag+par_level_flag+
2*rem_abs_gt1_flag.

Context selection for entropy coding, sig_coeff_flag is dependent on the state for the current coefficient. Syntax, par_level_flag is thus signaled in the first coding pass for deriving the state for the next coefficient. The syntax elements rem_abs_gt2_flag, abs_remainder, and coeff_sign_flag are further signaled in the second, third, and fourth coding passes, respectively. The fully reconstructed absolute value of a transform coefficient level is given by:

AbsLevel=AbsLevelPass1+2*(rem_abs_gt2_flag+
abs_remainder).

The transform coefficient level is given by:

TransCoeffLevel=(2*AbsLevel−(QState>1 ?1: 0))*
(1−2*coeff_sign_flag), whereQState indicates the state for the current transform coefficient.

For achieving high compression efficiency, the context-based adaptive binary arithmetic coding (CABAC) mode, or known as regular mode, is employed for entropy coding the values of the syntax elements in HEVC and VCC WD 2. FIG. 3 illustrates an exemplary block diagram of the CABAC process. Since the arithmetic coder in the CABAC engine can only encode the binary symbol values, the CABAC process needs to convert the values of the syntax elements into a binary string using a binarizer (310). The conversion process is commonly referred to as binarization. During the coding process, the probability models are gradually built up from the coded symbols for the different contexts. The context modeler (320) serves the modelling purpose. During normal context based coding, the regular coding engine (330) is used, which corresponds to a binary arithmetic coder. The selection of the modeling context for coding the next binary symbol can be determined by the coded information. Symbols can also be encoded without the context modeling stage and assume an equal probability distribution, commonly referred to as the bypass mode, for reduced complexity. For the bypassed symbols, a bypass coding engine (340) may be used. As shown in FIG. 3, switches (S1, S2 and S3) are used to direct the data flow between the regular CABAC mode and the bypass mode. When the regular CABAC mode is selected, the switches are flipped to the upper contacts. When the bypass mode is selected, the switches are flipped to the lower contacts as shown in FIG. 3.

In HEVC, the values of the syntax elements, coded_sub_block_flag, sig_coeff_flag, coeff_abs_level_greater1_flag, and coeff_abs_level_greater2_flag in a transform subblock are coded in the regular mode. The values of the syntax elements coeff_sign_flag and coeff_abs_level_remaining in a transform subblock are coded in the bypass mode. In order to limit the total number of the regular bins (or said context-coded bins) for entropy coding transform coefficient levels in a sub-block under the worst-case scenario, each subblock only allows to code up to eight coeff_abs_level_greater1_flag values and one coeff_abs_level_greater2_flag value. In this way, the maximum number of the regular bins in each subblock can be limited to 26.

In the development of emerging video coding standard, named VVC (versatile video coding), the maximum number of the regular bins in each TU is increased from HEVC. In order to reduce the complexity, methods and apparatus are developed to reduce the transform coefficient coding by constraining the maximum allowed context bins.

SUMMARY

A method and apparatus for encoding or decoding prediction residues in a video coding system are disclosed.

According to this method, input data corresponding to transform coefficients associated with a current transformed block (TB) are received. A maximum value of a remaining number of context-coded bins is determined initially for the current TB based on a size of a region after zero-out. At the encoder side, transform coefficients of the current TB are encoded using context-based coding with a constraint based on the remaining number of context-coded bins, where a bypass mode coding is applied instead of a regular context-based coding mode when the remaining number of context-coded bins is smaller than a first threshold. The coded current TB is then provided as output. At the decoder side, transform coefficients of the current TB are decoded using context-based coding with a constraint based on the remaining number of context-coded bins, where a bypass mode coding is applied instead of a regular context-based coding mode when the remaining number of context-coded bins is smaller than a first threshold. The reconstructed current TB is then provided as output.

A target transform coefficient of the current TB outside the region after zero-out is not coded at the encoder side. A target transform coefficient of the current TB outside the region after zero-out is not parsed at the decoder side.

In one embodiment, a width or height of the region after zero-out is clipped to a pre-defined value before said initially determining the maximum value of the remaining number of context-coded bins for the current TB. For example, the pre-defined value may correspond to 32. In another example, the pre-defined value corresponds to 16 if MTS (multiple transform set) is allowed for the current TB. In yet another example, the pre-defined value corresponds to 16 if MTS and sub-block transform is allowed for a current block containing the current TB.

In one embodiment, dependency of determining the maximum value of the remaining number of context-coded bins for the current TB comprises an area of the region after zero-out. For example, the dependency of said determining the maximum value of the remaining number of context-coded bins for the current TB comprises the area of the region after zero-out multiplied by a factor equal to 1.75.

Another method for decoding prediction residues in a video coding system is also disclosed. According to this method, a last significant CG (Coefficient Group) index for transform coefficients associated with the current TB is determined. A maximum value of a remaining number of context-coded bins is determined for the current TB based on the last significant CG index. The coded current TB is decoded to generate a reconstructed current TB using context-based coding with a constraint based on the remaining number of context-coded bins, where the context-based coding is forced to use a bypass mode is applied instead of a regular context-based coding mode when the remaining number of context-coded bins is smaller than a first threshold. In one embodiment, the maximum value of the remaining number of context-coded bins for the current TB corresponds to the last significant CG index multiplied by a factor and an area of coefficient groups, and wherein the factor is equal to 1.75.

DETAILED DESCRIPTION

Figure 1A:
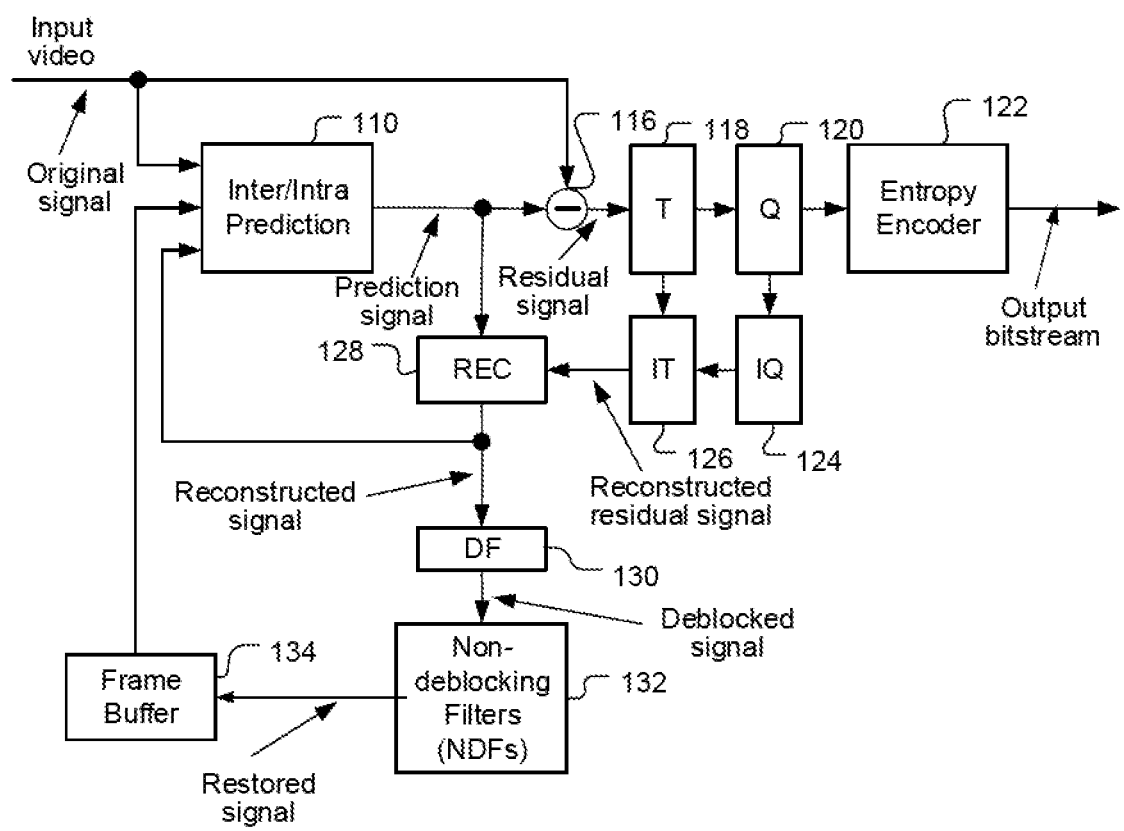
FIG. 1A illustrates an exemplary adaptive Inter/Intra video encoding system incorporating loop processing.
Figure 1B:
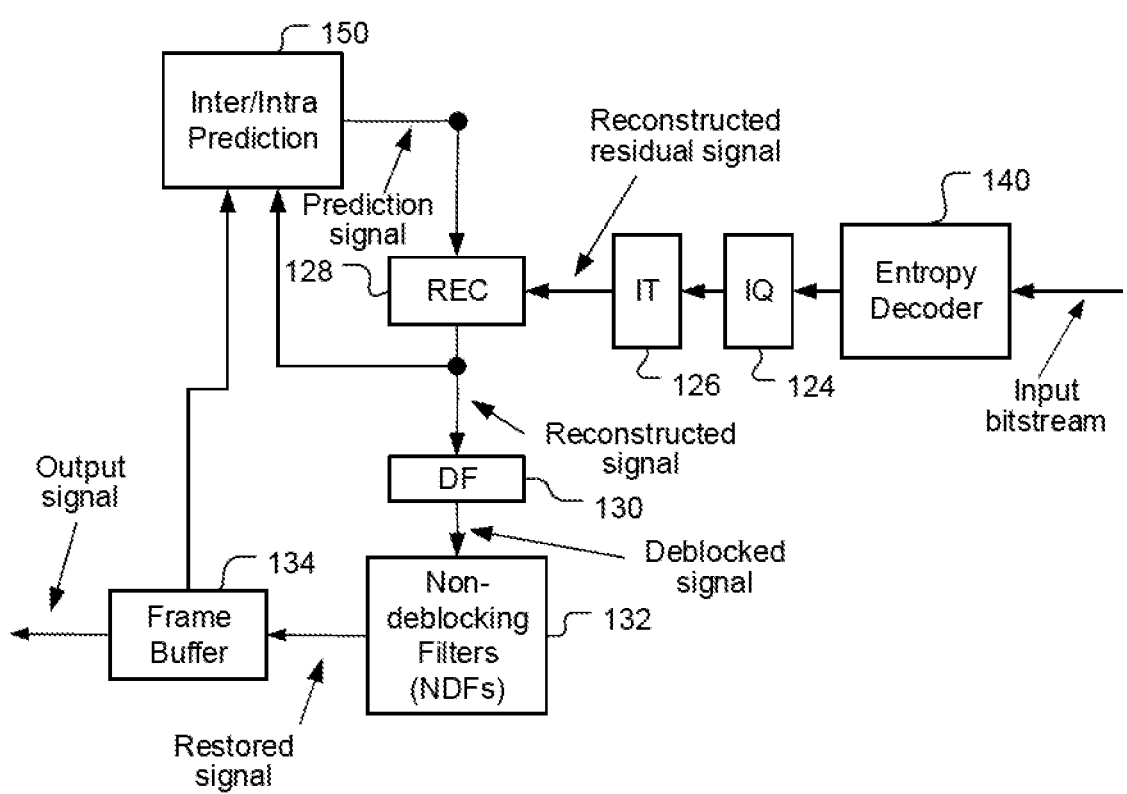
FIG. 1B illustrates an exemplary adaptive Inter/Intra video decoding system incorporating loop processing.
Figure 2:
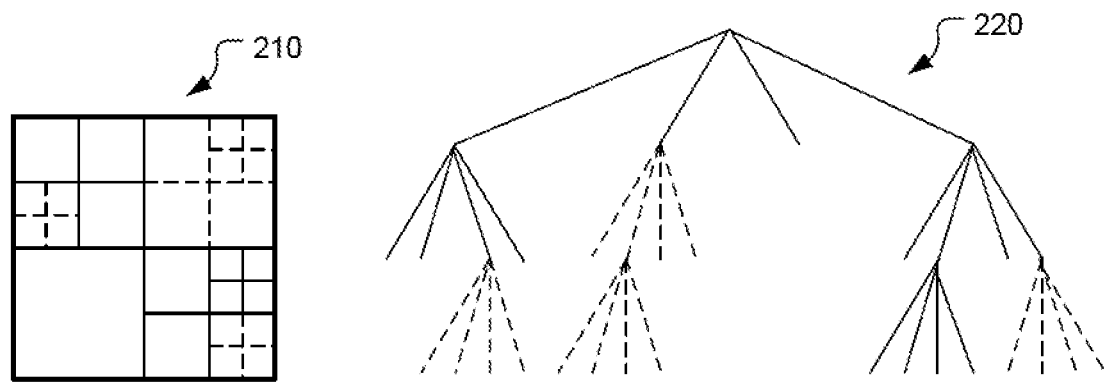
FIG. 2 illustrates an example of block partition using quadtree structure to partition a coding tree unit (CTU) into coding units (CUs).
Figure 3:
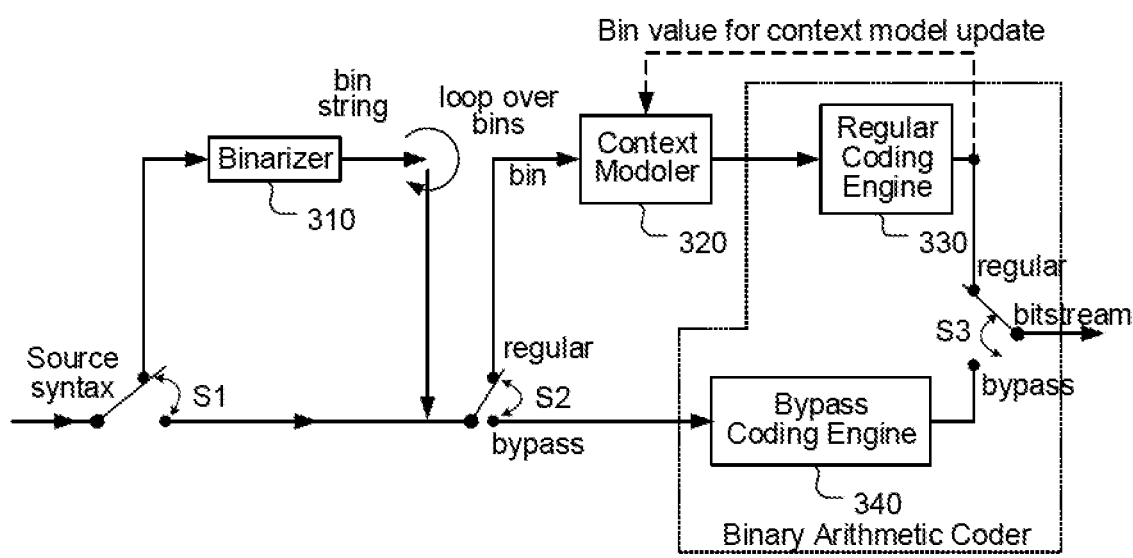
FIG. 3 illustrates an exemplary block diagram of the CABAC process.

The following description is of the best-contemplated mode of carrying out the invention. This description is made for the purpose of illustrating the general principles of the invention and should not be taken in a limiting sense. The scope of the invention is best determined by reference to the appended claims.

One aspect of the present invention relates to complexity reduction by reducing the number of coding passes for entropy coding a transform block or a sub-block. In one example, the syntax element, rem_abs_gt2_flag in JVET-K1001 may be coded in the same coding pass as rem_abs_gt1_flag. In another example, the information on the signs and remaining values of transform coefficients are often entropy coded using CABAC in a bypass mode and may be signaled in one coding pass. In one embodiment, all syntax elements entropy coded using CABAC in a regular mode are signaled in one coding pass. All syntax elements entropy coded using CABAC in a bypass mode are signaled in another coding pass.

Another aspect of the present invention relates to the constraints on the maximum allowed numbers of CABAC regular bins (or said maximum allowed numbers of context-coded bins) for coding a transform subblock. It is important for controlling the bitstream parsing throughput rate per subblock under the worst-case condition because entropy coding using CABAC in the regular mode is involved with much higher complexity than in the bypass mode. According to one aspect of the present invention, a video coder may have the constraint on the maximum allowed number of the regular bins in one subblock or one subblock coding pass, but have no specific constraints on the maximum allowed numbers of the regular bins for individual syntax elements present in the said subblock or the said subblock coding pass. The video coder may track the accumulated number of consumed regular bins in a current subblock or a current coding pass. When the specified maximum allowed number of regular bins is reached or the remaining allowed number of regular bins is smaller than a threshold, the video coder may have the CABAC engine switched to the bypass mode for the remaining coding passes in the current subblock. Alternatively, the video coder may terminate the coding passes in the regular CABAC mode. The remaining absolute values of the transform coefficient levels are all coded by the subblock coding passes in the bypass mode. In another embodiment, a video coder may have the constraint on the maximum allowed number of the regular bins in one subblock or one subblock coding pass and also have specific constraints on the maximum allowed numbers of the regular bins for individual syntax elements present in the said subblock or the said subblock coding pass.

In one example, a video coder may have a constraint on the maximum allowed number of regular bins in the leading subblock coding pass for entropy coding the transform coefficient levels generated by dependent scalar quantization as specified in JVET-K1001. The video coder may track the accumulated number of consumed regular bins in a current leading coding pass for signaling sig_coeff_flag, par_level_flag and rem_abs_gt1_flag using the syntax in JVET-K1001 or for signaling sig_coeff_flag, coeff_abs_level_greater1_flag, par_level_flag and coeff_abs_level_rs1_gt1_flag using the syntax in Table 1. When the accumulated number of regular bins is greater than a specified threshold value (or said the remaining number of regular bins is smaller than a specified threshold value), the video coder may have the CABAC engine switched to the bypass mode for coding the remaining pass. Or the video coder may terminate the current leading coding pass. The remaining absolute values of the transform coefficient levels are all coded by the subblock coding pass in the bypass mode for signaling abs_remainder using the syntax in JVET-K1001 or for signaling coeff_abs_level_rs1_remainder using the syntax in Table 1. In Table 1, the signaling of coeff_abs_level_rs1_gt1_flag[n] is omitted as indicated the gray background.

Table 1: Modified residual coding syntax according to one embodiment of the present invention

TABLE 1

Modified residual coding syntax according to one embodiment of the present invention

| | Descriptor |
|---|---|
| residual_coding( x0, y0, log2TbWidth, log2TbHeight, cIdx ) { | |
|   if(transform_skip_enabled_flag&&  ( cIdx != 0 \| !cu_mts_flag[ x0 ][ y0 ] == 0 )  && | |
|   ( log2TbWidth <= 2 )&& ( log2TbHeight <= 2 ) ) | |
|     transform_skip_flag[ x0 ][ y0 ][ cIdx ] | ae(v) |
|   last_sig_coeff_x_prefix | ae(v) |
|   last_sig_coeff_y_prefix | ae(v) |
|   if( last_sig_coeff_x_prefix> 3 ) | |
|     last_sig_coeff_x_suffix | ae(v) |
|   if( last_sig_coeff_y_prefix> 3 ) | |
|     last_sig_coeff_y_suffix | ae(v) |
|   log2SbSize = ( Min( log2TbWidth, log2TbHeight ) < 2 ? 1 : 2 ) | |
|   numSbCoeff = 1 << ( log2SbSize << 1 ) | |
|   lastScanPos = numSbCoeff | |
|   lastSubBlock = ( 1 << ( log2TbWidth + log2TbHeight − 2 * log2SbSize ) ) − 1 | |
|   do { | |
|     if( lastScanPos == 0 ) { | |
|       lastScanPos = numSbCoeff | |
|       lastSubBlock− − | |
|     } | |
|     lastScanPos− − | |
|     xS      =      DiagScanOrder[ log2TbWidth − log2SbSize ][ log2TbHeight − log2SbSize ] | |
|         [ lastSubBlock ] [ 0 ] | |
|     yS      =      DiagScanOrder log2TbWidth − log2SbSize ][ log2TbHeight − log2SbSize ] | |
|         [ lastSubBlock ] [ 1 ] | |
|     xC      =      (      xS<<      log2SbSize      )      + | |
|     DiagScanOrder[ log2SbSize ][ log2SbSize ] [ lastScanPos ] [ 0 ] | |
|     yC      =      (      yS <<      log2SbSize      )      + | |
|     DiagScanOrder[ log2SbSize ][ log2SbSize ][ lastScanPos ][ 1 ] | |
|   } while( ( xC != LastSignificantCoeffX ) \|\| ( yC != LastSignificantCoeffY ) ) | |
|   QState = 0 | |
|   for( i = lastSubBlock; i>= 0; i− − ) { | |
|     startQStateSb = QState | |
|     xS      =      DiagScanOrder log2TbWidth − log2SbSize ][ log2TbHeight − log2SbSize ] | |
|         [ lastSubBlock ] [ 0 ] | |
|     yS      =      DiagScanOrder log2TbWidth − log2SbSize ][ log2TbHeight − log2SbSize ] | |
|         [ lastSubBlock ] [ 1 ] | |
|     inferSbDcSigCoeffFlag = 0 | |
|     if( ( i < lastSubBlock ) && ( i > 0 ) { | |
|       coded_sub_block_flag[ xS ][ yS ] | ae(v) |
|       inferSbDcSigCoeffFlag = 1 | |
|     } | |
|     firstSigScanPosSb = numSbCoeff | |
|     lastSigScanPosSb = −1 | |
|     for( n = ( i == lastSubBlock) ? lastScanPos − 1 : numSbCoeff − 1; n >= 0; n− − ) { | |
|       xC = ( xS<< log2SbSize ) + DiagScanOrder[ log2SbSize ][ log2SbSize ] [ n ] [ 0 ] | |
|       yC = ( yS<< log2SbSize ) + DiagScanOrder[ log2SbSize ][ log2SbSize ] [ n ] [ 1 ] | |
|       if( coded_sub_block_flag[ xS ][yS ] && ( n > 0 \|\| !inferSbDcSigCoeffFlag) ) { | |
|         sig_coeff_flag[ xC ] [ yC ] | ae(v) |
|       } | |
|     ParityBit[n] = sig_coeff_flag[ xC ] [ yC ] | |
|       if( sig_coeff_flag[ xC ] [ yC ] ) { | |
|         if( lastSigScanPosSb == −1 ) | |
|           lastSigScanPosSb = n | |
|         firstSigScanPosSb = n | |

TABLE 1-continued

Modified residual coding syntax according to one embodiment of the present invention

|  | Descriptor |
|---|---|
|       coeff_abs_level_greater1_ flag [ n ]<br>      if( coeff_abs_level_greater1_flag [ n ] ) {<br>          par_level_flag[ n ]<br>          coeff_abs_level_rs1_gt1_flag [ n ]<br>          ParityBit[n] = par_level_flag[ n ]<br>      }<br>    }<br>    AbsLevelPass1[ xC ] [ yC ]    =<br>2 * ( coeff_abs_level_greater1_flag[ n ] + coeff_abs_level_rs1_gt1_flag[ n ] ) + Parity Bit[ n ]<br>      if( dep_quant_enabled_flag )<br>          QState = QStateTransTable[ QState ][ ParityBit[ n ] ]<br>    }<br>    for( n = numSbCoeff − 1; n >= 0; n− −) {<br>      if(coeff_abs_level_rs1_gt1_flag [ n ] )<br>          coeff_abs_level_rs1_gt1_flag [ n ]<br>    }<br>    for( n = numSbCoeff − 1; n >= 0; n− −) {<br>      xC = ( xS<< log2SbSize ) + DiagScanOrder[ log2SbSize ][ log2SbSize ] [ n ] [ 0 ]<br>      yC = ( yS<< log2SbSize ) + DiagScanOrder[ log2SbSize ][ log2SbSize ] [ n ] [ 1 ]<br>      if(coeff_abs_level_rs1_gt2_flag[ n ] )<br>          coeff_abs_level_rs1_remainder[ n ]<br>          AbsLevel[ xC ][ yC ]   =   AbsLevelPass1[ xC ][ yC ]  +<br>          2 * (coeff_abs_level_rs1_gt2_flag [ n ] + coeff_abs_level_rs1_remainder [ n ] )<br>    }<br>    if( dep_quant_enabled_flag | | !sign_data_hiding_enabled_flag )<br>      signHidden = 0<br>    else<br>      signHidden = ( lastSigScanPosSb − firstSigScanPosSb> 3 ? 1 : 0 )<br>    for( n = numSbCoeff − 1; n >= 0; n− − ) {<br>      xC = ( xS<< log2SbSize ) + DiagScanOrder[ log2SbSize ][ log2SbSize ] [ n ] [ 0 ]<br>      yC = ( yS<< log2SbSize ) + DiagScanOrder[ log2SbSize ][ log2SbSize ] [ n ] [ 1 ]<br>      if(          sig_coeff_flag[ xC ] [ yC ]          &&<br>    ( !signHidden | | ( n != firstSigScanPosSb ) ) )<br>          coeff_sign_flag[ n ]<br>    }<br>    if( dep_quant_enabled_flag ) {<br>      QState = startQStateSb<br>      for( n = numSbCoeff − 1; n >= 0; n− − ) {<br>          xC    =    (    xS<<    log2SbSize   )   +<br>          DiagScanOrder[ log2SbSize ][ log2SbSize ][ n ][ 0 ]<br>          yC    =    (    yS<<    log2SbSize   )   +<br>          DiagScanOrder[ log2SbSize ][ log2SbSize ][ n ][ 1 ]<br>          if( sig coeff flag[ xC ][ yC ] )<br>              TransCoeffLevel[ x0 ][ y0 ][ cIdx ][ xC ][ yC ]<br>              ( 2 * AbsLevel[ xC ][ yC ] − ( QState> 1 ? 1 : 0 ) ) *<br>              ( 1 − 2 * coeff_sign_flag[ n ] )<br>          QState = QStateTransTable[ QState ][ ParityBit [ n ] ]<br>    } else {<br>      sumAbsLevel = 0<br>      for( n = numSbCoeff − 1; n >= 0; n− − ) {<br>          xC    =    (    xS<<    log2SbSize   )   +<br>          DiagScanOrder[ log2SbSize ][ log2SbSize ][ n ][ 0 ]<br>          yC    =    (    yS<<    log2SbSize   )   +<br>          DiagScanOrder[ log2SbSize ][ log2SbSize ][ n ][ 1 ]<br>          if( sig_coeff_flag[ xC ][ yC ] ) {<br>              TransCoeffLevel[ x0 ][ y0 ][ cIdx ][ xC ][ yC ]       =<br>              AbsLevel[ xC ][ yC ] * ( 1 − 2 * coeff_sign_flag[ n ] )<br>              if( signHidden ) {<br>                  sumAbsLevel += AbsLevel[ xC ][ yC ]<br>                  if( (n = = firstSigScanPosSb ) && ( sumAbsLevel % 2 ) = = 1 ) )<br>                      TransCoeffLevel[ x0 ][ y0 ][ cIdx ][ xC ][ yC ]   =<br>                      −TransCoeffLevel[ x0 ][ y0 ][ cIdx ][ xC ][ yC ]<br>              }<br>            }<br>          }<br>      }<br>    }<br>}<br>if( cu_mts_flag[ x0 ][ y0 ] && ( cIdx = = 0 )          &&<br>!transform_skip_flag[ x0 ][ y0 ][ cIdx ]          &&<br>(      ( CuPredMode[ x0 ][y0 ] = = MODE INTRA && numSigCoeff > 2 ) | |<br>( CuPredMode[ x0 ][ y0 ] = = MODE INTER) ) ) {<br>    mts_idx[ x0 ][y0 ]<br>} | ae(v)<br>ae(v)<br>ae(v)<br><br><br><br><br><br><br><br><br><br>ae(v)<br><br><br><br><br><br><br><br><br>ae(v)<br><br><br><br><br><br><br><br><br><br><br><br><br><br><br><br><br><br><br><br><br><br><br><br><br><br><br><br><br><br>ae(v) |

Note that, in the coding pass, if the remaining available regular bin number is not larger than the required regular bin number of a coefficient in this coding pass, the video coder may have the CABAC engine switched to the bypass mode for coding the remaining pass. Alternatively, the video coder may terminate the current leading coding pass. The remaining absolute values of the transform coefficient levels are all coded by the subblock coding pass in the bypass mode. For example, if the pass encodes sig_coeff_flag, par_level_flag, rem_abs_gt1_flag, the termination threshold is 3. If the pass encodes sig_coeff_flag, par_level_flag, rem_abs_gt1_flag, and rem_abs_gt2_flag, the termination threshold is 4.

In one embodiment, a second termination threshold is defined. The second termination threshold is smaller than the first termination threshold as mentioned above. When the remaining available regular bin number is smaller than the first termination threshold, some of the syntaxes of the following coefficients (e.g. one next coefficient) still can be coded in context-coded bins. The syntaxes can be significant flag, greater than 1 flag, parity bit flag, greater than 2 flag, or any combination of above. For example, the syntaxes can be {significant flag}, {significant flag and greater than 1 flag}, {significant flag and parity bit flag}, or {significant flag, parity bit flag, and greater than 1 flag}. After parsing these syntaxes, if remaining available regular bin number is not larger than the second termination threshold, the video coder may have the CABAC engine switched to the bypass mode for coding the remaining pass. More than one termination threshold (e.g. the third termination threshold) can be added in the same concept.

Other aspects of the present invention relate to adaptation to the constraints on the maximum allowed numbers of regular bins for coding transform subblocks. The specified constraints may be pre-defined or explicitly signaled in the bitstream, for example, using one or more high-level syntax sets such as sequence parameter set (SPS), picture parameter set (PPS) or slice header. The specified constraints may be dependent on the profile and the level indicated in the coded bitstream. The different constraints may be employed for different color components. The different constraints may be employed for different transform subblock sizes. In one embodiment, a video coder according to JVET-K1001 may limit the maximum allowed number of regular bins for a 2×2 subblock to be equal to one quarter of the maximum allowed number of regular bins for a 4×4 subblock. In one embodiment, a video coder may limit the maximum allowed number of regular bins for a 4×4 chroma subblock to be equal to one half of the maximum allowed number of regular bins for a 4×4 luma subblock. The specified constraint for a 4×4 transform subblock may be signaled in the SPS. In one example, the specified constraint for a 4×4 luma subblock, 4×4 chroma subblock, 2×2 chroma subblock may be signaled in the SPS. In one embodiment, the maximum allowed number of regular bins for a 4×4 chroma subblock is equal to or smaller than the maximum allowed number of regular bins for a 4×4 luma subblock. In another embodiment, the maximum allowed number of regular bins for a 2×2 chroma subblock is equal to or smaller than the maximum allowed number of regular bins for a 2×2 chroma subblock.

In one embodiment, the maximum regular bins of a 4×4 luma subblock can be 25, 30, or 32; the maximum regular bins of a 4×4 chroma subblock can be 25, 16, or 15; and the maximum regular bins of a 2×2 chroma subblock can be 2, 3, 4, 5, 6, 7, or 8. For example, the maximum regular bins of {a 4×4 luma subblock, a 4×4 chroma subblock, a 2×2 chroma subblock} can be {25, 25, 8}, {25, 25, 6}, {25, 25, 7}, {32, 16, 4}, {32, 32, 8}, {30, 16, 4}, {30, 15, 4}, or {30, 15, 3}.

In another embodiment, the maximum regular bins of coding coeff_abs_level_rs1_gt2_flag can also be specified. For example, the maximum regular bins of the coeff_abs_level_rs1_gt2_flag in a 4×4 luma subblock can be 2, 3, 4, or 5; the maximum regular bins of the coeff_abs_level_rs1_gt2_flag in a 4×4 chroma subblock can be 0, 1, 2, 3, or 4; and the maximum regular bins of the coeff_abs_level_rs1_gt2_flag in a 2×2 chroma subblock can be 0, 1, or 2. For example, the maximum regular bins of {a 4×4 luma subblock, the coeff_abs_level_rs1_gt2_flag in a 4×4 luma subblock, a 4×4 chroma subblock, the coeff_abs_level_rs1_gt2_flag in a 4×4 chroma subblock, a 2×2 chroma subblock, the coeff_abs_level_rs1_gt2_flag in a 2×2 chroma subblock} can be {25, 4, 25, 4, 8, 2}, {25, 4, 25, 4, 6, 2}, {25, 4, 25, 4, 6, 1}, {25, 3, 25, 3, 6, 2}, {25, 3, 25, 3, 6, 1}, {25, 2, 25, 2, 6, 1}, {25, 2, 25, 2, 6, 0}, {25, 1, 25, 1, 6, 1}, {25, 1, 25, 1, 6, 0}, {25, 3, 25, 3, 7, 2}, {32, 4, 16, 2, 4, 1}, {32, 4, 16, 2, 4, 0}, {32, 4, 16, 4, 4, 1}, {32, 4, 16, 4, 4, 0}, {32, 3, 16, 2, 4, 1}, {32, 3, 16, 2, 4, 0}, {30, 4, 16, 2, 4, 1}, {30, 4, 16, 2, 4, 0}, {30, 3, 16, 2, 4, 1}, {30, 3, 16, 2, 4, 0}, {30, 4, 15, 2, 4, 1}, {30, 4, 15, 2, 4, 0}, {30, 3, 15, 2, 4, 1}, {30, 3, 15, 2, 4, 0}, {30, 4, 15, 2, 3, 1}, {30, 4, 15, 2, 3, 0}, {30, 3, 15, 2, 3, 1}, {30, 3, 15, 2, 3, 0}, {32, 4, 32, 4, 8, 1}. In one embodiment, the threshold value for greater than 2 flag in 2×2 chroma sub-block can be 0, which means no coding pass for greater than 2 flag.

In one embodiment, the constraint value for different syntaxes can be different. For one syntaxes, the constraint value can also be different in different color component and/or different sub-block size. For example, in luma 4×4 sub-block, the constraint value for significant flag can be 8, 10, 12, 14, 15, or 16. The constraint value for greater than 1 flag can be 4, 5, 6, 7, 8, 9, 10, 11, or 12. The constraint value for greater than 2 flag can be 0, 1, 2, 3, 4, 5, or 6. The constraint value for parity bit flag can be 4, 5, 6, 7, 8, 9, 10, 11, or 12. In chroma 4×4 sub-block, the constraint value for significant flag can be 2, 3, 4, 5, 6, 7, 8, 9, or 10. The constraint value for greater than 1 flag can be 4, 5, 6, 7, 8, 9, 10, 11, or 12. The constraint value for greater than 2 flag can be 0, 1, 2, 3, 4, 5, or 6. The constraint value for parity bit flag can be 2, 3, 4, 5, 6, 7, 8, 9, or 10. For the chroma 2×2 sub-block, the constraint value for significant flag can be 0, 1, 2, 3, or 4. The constraint value for greater than 1 flag can be 0, 1, 2, 3, or 4. The constraint value for greater than 2 flag can be 0, 1, 2, 3, or 4. The constraint value for parity bit flag can be 0, 1, 2, 3, or 4. In one embodiment, for luma 4×4 sub-block, the constraint value for significant flag, greater than 1 flag, and greater than 2 flag can be {16, 10, 2} or {16, 8, 1}. In chroma 4×4 sub-block, the constraint value for significant flag, greater than 1 flag, and greater than 2 flag can be {16, 10, 2}, {12, 6, 1}, {12, 6, 0}, or {16, 8, 1}. In chroma 2×2 sub-block, the constraint value for significant flag, greater than 1 flag, and greater than 2 flag can be {4, 2, 1}, {4, 2, 0}, {3, 2, 0}, {3, 2, 1}, or {3, 1, 0}.

A video coder may alternatively have the constraints on the maximum allowed numbers of regular bins specified for entropy coding some sizes of transform units or transform blocks. The constraints on the maximum allowed numbers of regular bins for a current subblock can be derived from the constraints specified for the related transform unit or transform block. For example, the constraints on the maximum allowed numbers of regular bins for 4×4 transform subblocks and 2×2 transform subblocks can be derived from the constraints on the maximum allowed numbers of regular bins for 4×4 transform blocks and 2×2 transform blocks, respectively, in a video coder according to JVET-K1001.

When the rem_abs_gt2_flag is included in the leading coding pass and the regular bin number constraint value of rem_abs_gt2_flag is specified separately (from the regular bin number constraint value of sig_coeff_flag, par_level_flag, rem_abs_gt1_flag) and the rem_abs_gt2_flag is signaled, the remaining level of the coefficient is coded when the partial sum of the coefficient (e. g., (sig_flag+gt1_flat+par_flag+(gt2_flag<<1)) or (sig_flag+par_flag+(gt1_flat<<1)+(gt2_flag<<1))) is equal to or larger than 5 if the parity bit is signaled before rem_abs_gt1_flag and is equal to or larger than 4 if the parity bit is signaled after rem_abs_gt1_flag. Otherwise, the remaining level of the coefficient is not coded. If the rem_abs_gt2_flag is not signaled because that the available number of regular bin of rem_abs_gt2_flag is zero, the remaining level of the coefficient is coded when the partial sum of the coefficient is equal to or larger than 4 if the parity bit is signaled before rem_abs_gt1_flag and is equal to or larger than 2 if the parity bit is signaled after rem_abs_gt1_flag. Otherwise, the remaining level of the coefficient is not coded. However, if available number of regular bin is smaller than a threshold, in one embodiment, the leading coding pass is terminated, the level is coded with Golomb-Rice code directly if the coefficient is not coded by the leading pass. When the leading coding pass is terminated, the remaining level coding pass is performed. The remaining level coding pass starts from the last position of the current subblock to the first position of the subblock.

In one embodiment, it is proposed to use one coding pass to encode all context-coded bins of the coefficients in a sub-block. In this coding pass, the context-coded bins of one coefficient are coded in order, such as significant flag→greater than 1 flag→greater than 2 flag, or significant flag→greater than 1 flag→parity bit flag→greater than 2 flag, or significant flag→parity bit flag→greater than 1 flag→greater than 2 flag. After the context-coded bins are parsed, the remaining level and sign bits are parsed by using the bypass bins.

When the rem_abs_gt2_flag is included in the leading coding pass and the regular bin number constraint value of rem_abs_gt2_flag is specified not separately, the remaining level of the coefficient is coded when the partial sum of the coefficient (e.g., (sig_flag+gt1_flat+par_flag+(gt2_flag<<1)) or (sig_flag+par_flag+(gt1_flat<<1)+(gt2_flag<<1))) is equal to or larger than 5 if the parity bit is signaled before rem_abs_gt1_flag and is equal to or larger than 4 if the parity bit is signaled after rem_abs_gt1_flag. Otherwise, the remaining level of the coefficient is not coded. However, if available number of regular bin is smaller than a threshold, in one embodiment, the leading coding pass is terminated, the level is coded with Golomb-Rice code directly if the coefficient is not coded by the leading pass. When the leading coding pass is terminated, the remaining level coding pass is performed. The remaining level coding pass starts from the last position of the current subblock to the first position of the subblock.

In another embodiment, the maximum allowed number of regular bins (or said maximum allowed numbers of context-coded bins) is specified for a transform block (TB) or a transform unit (TU). The threshold value of a TU can be derived from the threshold of a 4×4 sub-block. Note that, for a specific color component (i.e., luma or chroma), the TU mentioned here is actually referred as a TB. Accordingly, the TU may refer to the TB in the following disclosure whenever appropriate. For example, if the TU is a luma 8×8 block and the threshold of a luma 4×4 block is 32, the threshold of this 8×8 luma TU is 32×4=128. Here, the TU is associated with a luma block, therefore, the TU here means a TB. The threshold value can be different for different color component or different TU size. For coding the coefficient subblock of the TU, the allowed numbers of regular bins value can be shared across the subblocks. For example, in the first subblock, the allowed value is 128. When coding the first subblock, the allowed value is decreased when using regular bin for coding coefficients. The remaining allowed value is used for the next subblock. In another embodiment, the number of required coded subblock can be derived after encoded/decoded the last significant coefficient position/index or the last significant subblock (i.e., the last coefficient group) position/index. The number of required coded subblock, the last significant coefficient position/index, or the last significant subblock position/index can be used to derive the maximum allowed numbers of regular bins of a subblock or the maximum allowed numbers of regular bins of a TU. For example, for a 16×16 TU, it has 16 4×4 subblock. The total allowed regular bins number can be 32×16=512. After decoding the last significant coefficient position, if the required coded subblock number is 8, than each subblock can use 64 regular bins. In another example, according to the last significant subblock position/index, the maximum allowed numbers of regular bins of a TU can be derived as the number of required coded subblock multiplied by a threshold. The threshold can be different from different color component or different subblock size. In another embodiment, the constraints on the maximum allowed numbers of regular bins is specified for a transform subblock or for a transform block, however, the constraint number can depend on the current TU size, TU type, TU width, TU height, total number of subblocks in current TU, subblock size, subblock width, subblock height, color component, last significant coefficient position, last significant subblock position, or any combination of above.

In one example, the constraint number can depend on total number of subblocks in current TU, color component, subblock size, and last significant subblock position. When last significant subblock position is determined, the number of subblock to be coded can be determined. If the number of subblock to be coded is smaller than the total number of subblocks in current TU, it means some subblock is skipped in entropy coding and the constraint on the maximum allowed numbers of regular bins per subblock can be increased. In one example, the default constraint value of a subblock can be multiplied by a factor. The factor can be related to (the total number of subblocks in current TU)/(the number of subblock to be coded), or floor((the total number of subblocks in current TU)/(the number of subblock to be coded)), where floor(x) means to find the maximum integer value that is smaller than or equal to x. In another example, some predefined factor can be specified. The factor can be {4, 2, 1.5, 1.25, 1}.

The total number of subblocks in the current TU can be defined as A, the number of subblock to be coded can be defined as B. In one example, if B*4<=A, then the factor can be 4. Otherwise, if B*2<=A, then the factor can be 2. Otherwise, if B*3<=A*2, then the factor can be 1.5. Otherwise, if B*5<=A*4, then the factor can be 1.25. Otherwise, the factor can be 1. In another example, if B*4<=A, then the factor can be 4. Otherwise, if f*3<=A, then the factor can be 3. Otherwise, if f*2<=A, then the factor can be 2. Otherwise, if B*3<=A*2, then the factor can be 1.5. Otherwise, if f*5<=A*4, then the factor can be 1.25. Otherwise, the factor can be 1. For different syntax type or different subblock size or different color component, the factor can be different.

In another embodiment, the threshold of maximum allowed context coded bins can be increased depending on the index/position of the current coefficient sub-block and/or the index/position of the last significant coefficient sub-block. For example, for the coefficient sub-blocks that are closer to the DC, the higher threshold of maximum allowed context coded bins is applied. The coefficient sub-blocks that is farther to the DC, the lower threshold of maximum allowed context coded bins is applied. In one example, the index of coefficient sub-block of DC sub-block is 0 and the index of the last significant coefficient sub-block is K, then the first threshold is used for the sub-block with the (sub-block index*2) larger than K. The second threshold is used for sub-block with the (sub-block index*2) equal to the K. The third threshold is used for sub-block with the sub-block index*2 smaller than the K. In one example, the first threshold is smaller than or equal to the second threshold, the second threshold is smaller than or equal to the third threshold. The first threshold can be the (original threshold*A), the second threshold can be the original threshold, and the third threshold can be the (original threshold/A) or (2*original threshold−A). The A can be 1.25, 1.5, and 2. In another example, the first threshold is larger than or equal to the second threshold, the second threshold is larger than or equal to the third threshold.

In JEVT-M0305, a joint chroma residual coefficient coding is proposed. A flag, chroma_joint_coding_flag, is signaled to indicate whether the Cb and Cr are coded jointly. If Cb and Cr are coded jointly, only the Cb coefficient residual are coded. The Cr coefficient residual are reconstructed as the (Cb residual*(−1)).

In one embodiment, the chroma joint coding is applied for non-transform skip TU. When the transform skip is applied, the chroma_joint_coding_flag is inferred as 0. In another embodiment, the chroma joint coding is only applied for certain TU size. For example, when the TU size/width/height is smaller than a threshold, the chroma joint coding is not applied. In one example, when the TU width or height is smaller than 8 or the area is smaller than 64 or 32, the chroma joint coding is not applied. In another example, when the TU size/width/height is larger than a threshold, the chroma joint coding is not applied. In another embodiment, the chroma joint coding is not applied for the luma coding tree when the dual tree coding is applied. In another embodiment, the chroma joint coding is not applied for some coding mode. For example, it is not applied on the Intra block copy mode (or Intra mode or inter mode). In another embodiment, the chroma joint coding is not applied for some QP range. In one embodiment, when the chroma joint coding is applied, the threshold of maximum allowed context coded bins of the chroma block can be enlarged, e.g. doubled or multiplied by N. For example, for a 4×4 chroma block, if the maximum allowed context coded bins is 16 and the chroma joint coding is applied, the maximum allowed context coded bins can be extended to be 32.

In another embodiment, for the first N coefficient in a residual sub-block, the context coded bins can be used. For example, for the first N coefficient, the significant flag, greater than one flag, parity bit flag, and/or greater than two flag can be coded with context coded bins. For the rest coefficients, only the bypass bins can be used. In another embodiment, for the last N coefficient in a residual sub-block, the context coded bins can be used. For example, for the last N coefficient, the significant flag, greater than one flag, parity bit flag, and/or greater than two flag can be coded with context coded bins. For the rest coefficients, only the bypass bins can be used. The N can be different for different color component or different sub-block size. In one embodiment, the number of context coded bins is counted for each sub-block. A threshold is also specified. If the used context coded bins do not exceed the threshold, the N can be larger for the next coefficient sub-block. The N can be reset for each TU.

In VVC, a coefficient zeroing-out technique is disclosed. The zeroing-out technique sets coefficients in a region to zero. For example, the region corresponding to high-frequency coefficients can be set to zero and not coded. Therefore, when the zeroing-out is applied, only the region after zero-out needs to be coded.

In another embodiment, the constraint on the number of context coded bins can be applied to the TU/TB-level or CU-level instead of the coefficient sub-block-level. The maximum value of the remaining number of context coded bins can be dependent on the TU or CU size/area or color component or the last significant coefficient position/index or the last significant subblock position/index or region after zero-out. For example, the maximum value of the remaining number of context coded bins for a 4×4 luma coefficient sub-block can be 30, and the value for a 4×4 chroma coefficient sub-block can be 16. Therefore, the maximum value of the remaining number of context coded bins of a luma TB with size equal to 16×16 can be equal to 480 (30*(16*16)/(4*4)). The maximum value of the remaining number of context coded bins of a chroma TB with size equal to 16×16 can be equal to 256 (16*(16*16)/(4*4)). A variable of remaining number of context coded bins is set equal to the maximum value of the remaining number of context coded bins at the starting process of encoding/decoding a TB, TU, or a CU. When coding a context coded bin, the quota of remaining number of context coded bins is decreased by 1. When the quota is 0 or smaller than a second threshold (e.g. 1, 2, 3, or 4), the rest coefficients are coded in bypass bins (e.g. using the remaining level coding method). A simple left shift can be used to derive the number of context coded bins for a TB or CU. For example, for a luma TB, the maximum value of the remaining number of context coded bins can be K<<(log 2TbWidth+log 2TbHeight−4), where K can be 28, 30, 32, or a positive integer.

In another example, the maximum value of the remaining number of context coded bins can be TB_width*TB_height*M, where M can be 2, 1.5, 30/16, 28/16, 1.875, 1.75, or a positive value. For a chroma TB, the maximum value of the remaining number of context coded bins can be L<<(log 2TbWidth+log 2TbHeight−4), where L can be 16, 20, 28, 30, 32, or a positive integer. In another example, the maximum value of the remaining number of context coded bins can be TB_width*TB_height*N, where N can be 2, 1.5, 1, 1.25, 30/16, 28/16, 1.875, 1.75, or a positive value. In another example, for a luma TB, the maximum value of the remaining number of context coded bins can be K<<(log 2TbWidth+log 2TbHeight−2), or can be equal to ((1<<(log 2TbWidth+log 2TbHeight))*K)>>2, where K can be 4, 5, 7, 7.5, 8, 16, 20, 28, 30, 32, or a positive integer, or a positive number. For a chroma TB, the maximum value of the remaining number of context coded bins can be L<<(log 2TbWidth+log 2TbHeight−2)), or can be equal to ((1<<(log 2TbWidth+log 2TbHeight))*L)>>2, where L can be 4, 5, 7, 7.5, 8, 16, 20, 28, 30, 32, or a positive integer.

In one example, the TbWidth and/or TbHeight can be the TB width or height before or after the coefficient zero-out.

For example, in order to reduce the average case of context coded bins, the TB area after zero-out is used to derive the maximum value of the remaining number of context coded bins. For a 64×N or N×64 TB (e.g. luma TB), the coefficients outside of the upper-left 32×32 region are set to be zeros and not coded or not parsed. The TB width and height are limited to 32 when the zero-out is applied. The clipped TbWidth and TbHeight can be used to derive the TU/TB/CU/PU-level maximum value of the remaining number of context coded bins constraint. When the TB width or height is larger than 32, the width or height of the region after zero-out is clipped to 32. The clipped width or height of the region after zero-out is used to derive the TB-level maximum value of the remaining number of context coded bin. In another example, when the multiple transform set (MTS) is applied, the coefficients outside of the upper-left 16×16 region are also set to be zeros and not coded. The TB width and height are limited to up to 16 when the zero-out and MTS are applied. The clipped TbWidth and TbHeight can be used to derive the TU/TB/CU/PU-level maximum value of the remaining number of context coded bins. In another example, when MTS and sub-block transform (SBT) are enabled and the SBT is applied to a CU, the inferred MTS is used. The DST7 or DCT8 transform is selected for the vertical or horizontal transform. The coefficients outside of the upper-left 16×16 region are also set to be zeros and not coded. The TB width and height are limited to up to 16 when the SBT and MTS are applied. The clipped TbWidth and TbHeight can be used to derive the TU/TB/CU/PU-level maximum value of the remaining number of context coded bins.

In yet another example, the number of required coded subblocks, the last significant coefficient position/index or the last significant subblock position/index can be used to derive the maximum value of the remaining number of context coded bins of a TB. For example, the maximum value of the remaining number of context coded bins can be the number of required coded subblocks or the last significant subblock index plus one multiplied by a third threshold. The third threshold can be different for different color component or different sub-block size. For example, the third threshold can be 28, 30, 32, or a positive integer for luma component (of a 4×4 subblock). The third threshold can be 12, 16, 20, 28, 30, 32, or a positive integer for chroma component (of a 4×4 subblock). The third threshold can be 4, 5, 6, 7, 8, or a positive integer for chroma component of a 2×2 subblock. In another example, the maximum value of the remaining number of context coded bins of a TB can be derived by the number of samples of the required coded subblocks multiplied by a fourth threshold. The number of samples of the required coded subblock can be the number of required coded subblocks or the last significant subblock index plus 1 multiplied by the number of samples of a subblock. The fourth threshold can be 1.75 (or 1, 1.25. 1.5, 2, or a positive number) for luma component. The fourth threshold can be 1.25 (or 1, 1.5. 1.75, 2, or a positive number) for chroma component.

When coding the coefficient subblock significant flag, significant flag, greater than one flag, parity bit flag, and/or greater than two flag, the number of used context coded bins is increased by 1 (i.e., the allowed/remaining number of context coded bin decreased by 1). The sub-block significant group flag can also be counted. In one embodiment, if a coefficient subblock is all zero, such as the sub-block significant group flag equal to 0, the number of used context coded bins can be decreased by the third threshold or decreased by the subblock size multiplied by the third threshold. For the zero-out region (i.e., the coefficient sub-block with no coefficient), the number of used context coded bins can be decreased by the third threshold or decreased by the subblock size multiplied by the third threshold. If the allowed/remaining number of context coded bins is smaller than a threshold, coefficient coding is switch to bypass bin mode.

In another embodiment, the constraint on the number of context coded bins can be applied to the CU-level. For a CU, its maximum value of the remaining number of context coded bins for luma component and chroma component can be calculated in the same way as the TU/TB-level threshold described above. For the CU-level constraint, the available context coded bins can be shared cross the color components. In one example, a CU-level maximum value of the remaining number of context coded bins is calculated. All the TUs with different color components can share this CU-level remaining number of context coded bins. For example, if the luma TU is coded before chroma TUs, after coding the luma TU, the available number of context coded bins is used for the chroma components. In another example, the CU-level luma maximum value of the remaining number of context coded bins and chroma maximum value of the remaining number of context coded bins are calculated, respectively. If the luma TU(s) is coded before the chroma component, it only uses the CU-level luma remaining number of context coded bins. If not all the context coded bins for luma are used, the rest of context coded bins can be used for chroma components. The chroma maximum value of the remaining number of context coded bins can be increased by adding the remaining allowed context coded bins from the luma component. In another example, the CU-level maximum value of the remaining numbers of context coded bins for luma, cb and cr components are calculated respectively. According to the coding order, the remaining allowed context coded bins in one color component can be used for the following color components. In one example, the remaining allowed context coded bins can all be added to the next color component. In another example, the remaining allowed context coded bins can be added to the following color components equally or differently.

The proposed method can also be applied for inferred TU split. For example, if the CU size is larger than the maximum TU size, the current CU will be divided into more than one TUs. The CU-level maximum value of the remaining number of context coded bins can be calculated. In one embodiment, the CU-level remaining number of context coded bins is shared for all sub-TUs. In another embodiment, each TU has its maximum value of the remaining number of context coded bins. After coding a sub-TU, if there are remaining allowed context coded bins, the remaining allowed context coded bins can be used by the following sub-TUs. The quota of allowed context coded bins of following sub-TU can be increased.

In another embodiment, for each TB or TU or CU, the maximum value of the remaining number of context coded bins, e.g. maxNumCtxBin, is derived. The maxNumCtxBin can depend on the CU/TU/TB size/width/height, color component, coefficient sub-block size, whether using joint chroma residual coding, or any of the combination of above. For example, for a luma TB, the threshold can be K<<(log 2TbWidth+log 2TbHeight−4), where K can be 28, 30, 32, or a positive integer. For a chroma TB, the threshold can be L<<(log 2TbWidth+log 2TbHeight−4), where L can be 16, 20, 30, 28, 32, or a positive integer. In another example, for a lumaTB, the maximum value of the remaining number of context coded bins can be K<<(log 2TbWidth+log 2TbHeight−2), where K can be 7, 7.5, 8, 28, 30, 32, a positive integer, or a positive number. For a chromaTB, the maximum value of the remaining number of context coded bins can be L<<(log 2TbWidth+log 2TbHeight−2), where L can be 4, 8, 20, 16, 28, 32, or a positive integer. When coding a coefficient sub-block, the used number of context coded bins is recorded. For example, when coding the significant flag, greater than one flag, parity bit flag, and/or greater than two flag, the number of used context coded bins is increased by 1 (or said the remaining number of context coded bins is decreased by 1). The sub-block significant group flag can also be counted.

When the quota of number of context coded bins (or said the remaining number of context coded bins) is larger than or equal to a threshold T, every coefficient in the sub-block can use context coded bin for coding the significant flag, greater than one flag, parity bit flag, and/or greater than two flag. There is no need to use bypass bins to encode the whole coefficient. When the quota of number of context coded bins is smaller than T, in one example, every coefficient in the sub-block uses bypass bins for coding the coefficients. In another example, one flag or syntax is signaled to indicate whether the context coded bins can be used for the sub-block. If yes, every coefficient in the sub-block can use context coded bin for coding the significant flag, greater than one flag, parity bit flag, and/or greater than two flag. Otherwise, every coefficient in the sub-block uses bypass bins for coding the coefficients. In one embodiment, if the flag or syntax indicates that every coefficient in the sub-block uses bypass bins for coding the coefficients, the following sub-block is inferred to use bypass bins for coding the coefficients.

The threshold T can be dependent on color component or/and sub-block size or/and using joint chroma residual coding. For example, the T can be 64 for 4×4 sub-block or 16 for 2×2 sub-block. In another example, the T can be 30 or 32 for 4×4 luma sub-block, 16 for 4×4 chroma sub-block, and 4 for the 2×2 chroma sub-block. When the joint chroma residual coding is applied, the chroma threshold can be doubled. The proposed constraint can be applied for certain TU sizes, such as the TU area larger than 32 or 64. For other size TU, the bypass bins are used for coding the coefficients. In another embodiment, when the quota of number of context coded bins is smaller than T, only N coefficients can use context coded bins for coding the coefficient levels in the sub-block. It can be the last N coefficients from the last significant coefficient in the sub-block/TU, last N coefficient in the sub-block/TU, or the first N coefficient in the sub-block/TU. For the rest coefficient, it only can use bypass bins (e.g. coding the level by using exp-Golomb code directly). N can be derived from the quota of number of context coded bins, such as quota of number of context coded bins>>2 or 1.

For the following sub-blocks, only the bypass bins can be used for coding the coefficient levels. In one embodiment, the proposed method can be applied for certain kind of sub-block/CU/TU/TB, e.g. for the TU with area/width/height larger than a threshold (e.g. area larger than 16, 32, or 64). For the CU/TU/TB not satisfying the conditions, the original coding method is applied or no context bin constraint is applied (e. g. all syntax being coded with context coded bins). In one example, an encoder constraint is applied for these CU/TU/TB not satisfying the conditions. A maxNumCtxBin is derived for the sub-block/CU/TU/TB. It is a bitstream conformance requirement that the used number of context coded bins cannot exceed the maxNumCtxBin for the sub-block/CU/TU/TB.

In another embodiment, for each CU/TU, the maximum value of the remaining number of context coded bins, such as maxNumCtxBin, is derived. The maxNumCtxBin can depend on the CU/TU size/width/height, color component, coefficient sub-block size, whether using joint chroma residual coding, the last significant coefficient position/index, or any of the combination of above. According to the position or index of the last significant sub-block and/or the maxNumCtxBin and/or sub-block size, the number of context coded bins for coding coefficient level allowed for the coefficient sub-block can be derived. For those coefficient sub-blocks, every coefficient in the sub-block can use context coded bin for coding the significant flag, greater than one flag, parity bit flag, and/or greater than two flag. For the rest coefficient sub-blocks, every coefficient in the sub-block uses bypass bins for coding the coefficient levels. The number of coefficient sub-blocks that can use context coded bins can be equal to maxNumCtxBin>>3, maxNumCtxBin>>4, maxNumCtxBin>>5, maxNumCtxBin>>6, or maxNumCtxBin>>K, where K can depend on the TU size/width/height, color component, coefficient sub-block size, whether using joint chroma residual coding, or any of the combination of above.

In another embodiment, instead of the number of coefficient sub-blocks that can use context coded bins, the number of coefficients that can use context coded bins is derived. Only N coefficients can use context coded bins for coding the coefficient levels in the TU. It can be the last N coefficients from the last significant coefficient in the TU, last N coefficients in the TU, or the first N coefficients in the TU. In one embodiment, an encoder constraint can also be applied. It is a bitstream conformance requirement that the used number of context coded bins in the TU, CU or PU shall be smaller than or equal to the maxNumCtxBin.

In another embodiment, for a TU, the last sub-block that can use context coded bins for coding coefficient level can be signaled. One or more syntax (e.g. positions x and y, or sub-block index) can be used to indicate the position of the last sub-block that can use context coded bins for coding coefficient level. Before or after that sub-block, every coefficient in the sub-block can use context coded bins for coding the significant flag, greater than one flag, parity bit flag, and/or greater than two flag. After or before that sub-block, every coefficient in the sub-block uses bypass bins for coding the coefficient levels. The syntax can depend on the maxNumCtxBin, last significant sub-block position/index, TU size/width/height, color component, sub-block size, whether using joint chroma residual coding, or any of the combination of above.

In another embodiment, for a 4×4 coefficient sub-block or 4×4 TU, only N coefficients can use context coded bins for coding the coefficient levels. It can be the last N coefficients from the last significant coefficient, last N coefficients in the sub-block/TU, or the first N coefficients in the sub-block/TU. For the rest coefficients, they can only use bypass bins (e.g. coding the level by using exp-Golomb code directly). N can depend on the TU size/width/height, color component, coefficient sub-block size, whether using joint chroma residual coding, or any combination of the above. N can be 8 for 4×4 TU.

In another embodiment, in addition to the TU-level threshold, the sub-block-level threshold can also be applied. If the quota of the sub-block-level threshold is reached, the bypass mode is used for the sub-block. If the TU-level quota is not reached, the context coded bin can be used for the next sub-block. If the TU-level quota is reached, all the coefficients in the current TU can only be coded using bypass bins. The sub-block-level threshold/quota is reset for each sub-block.

Yet in another embodiment, a coefficient TU can be divided in one or more segments. Different thresholds/quotas can be applied to different segments. For example, a coefficient TU can be divided into 2 or 3 segments. For the high frequency segment, the higher (or smaller) threshold can be applied. When the quota is reached, only the bypass mode can be used for this segment. The above segmentation method can be used. For example, the index of coefficient sub-block of DC sub-block is 0 and the index of the last significant coefficient sub-block is K, then the first segment is for the sub-block with the sub-block index*2 larger than K. The second segment is for the sub-block with the sub-block index*2 equal to the K. The third segment is for the sub-block with the sub-block index*2 smaller than the K. The segmentation can depend on the position in the TU or the scan order (e.g. sub-block scan order) in a TU.

In another embodiment, the number of context coded bins constraint can be the encoder constraint. For each TU, the maximum value of the remaining number of context coded bins, e.g. maxNumCtxBin, is derived. The maxNumCtxBin can depend on the TU size/width/height, color component, coefficient sub-block size, whether using joint chroma residual coding, the last significant coefficient position/index or the last significant subblock position/index, or any of the combination of above. For example, for a luma TU, the threshold can be K<<(log 2TbWidth+log 2TbHeight−4), where K can be 28, 30, 32, or a positive integer. In another example, the threshold can be TU_width*TU_height*M, where M can be 2, 1.5, 30/16, 28/16, 1.875, 1.75, or a positive value. For a chroma TU, the threshold can be L<<(log 2TbWidth+log 2TbHeight−4), where L can be 16, 20, 30, 32, or a positive integer. In another example, the threshold can be TU_width*TU_height*N, where N can be 2, 1.5, 1, 1.25, 30/16, 28/16, 1.875, 1.75, or a positive value. In another example, for a luma TU, the threshold can be K<<(log 2TbWidth+log 2TbHeight−2), where K can be 7.5, 8, 28, 30, 32, or a positive integer, or a positive number. For a chroma TU, the threshold can be L<<(log 2TbWidth+log 2TbHeight−2), where L can be 4, 8, 16, 20, 28, 32, or a positive integer.

For each TU/CU, the used number of context coded bins cannot exceed the derived maxNumCtxBin. In the CU-level constraint, all the color components share one context coded bin constraint. It is a bitstream conformance requirement that the used number of context coded bins in a TU/CU/PU shall be smaller than or equal to the maxNumCtxBin. In one example, when coding the significant flag, greater than one flag, parity bit flag, and/or greater than two flag, the number of used context coded bins is increased by 1. The sub-block significant group flag can also be counted. The proposed constraint can be applied for certain TU/CU sizes. For example, the proposed constraint can be applied for the TU area larger than 32 or 64. For other size TUs, the bypass bins are used for coding the coefficients. In another embodiment, for other size TU, every coefficient in the TU can use context coded bin for coding the significant flag, greater than one flag, parity bit flag, and/or greater than two flag. Another tile/tile group/CTU/CTU-row/slice/picture/sequence-level number of context coded bin constraint can also be applied. For each tile/tile group/CTU/CTU-row/slice/picture/sequence, the maximum number of context coded bins, e.g. totalMaxNumCtxBin, is derived. It is a bitstream conformance requirement that the used number of context coded bins in the tile/tile group/CTU/CTU-row/slice/picture/sequence shall be smaller than or equal to the maxNumCtxBin. In one embodiment, when coding a coefficient, the used number of context coded bins is recorded. For example, when coding the significant flag, greater than one flag, parity bit flag, and/or greater than two flag, the number of used context coded bins is increased by 1. When the quota of number of context coded bins is smaller than a threshold, all the coefficients in the sub-block/TU/CU/PU/CTU/CTU-row/tile/tile group/slice/picture/sequence can only use bypass bins for coding the coefficient levels.

In one embodiment, one or more syntaxes indicating whether the current sub-block/CU/TU/transform block/tile/tile group/CTU/CTU-row/group of CTUs/slice/picture/sequence/region use all bypass bin coding or not are signaled. If the syntax indicates that the bypass mode is used, all the coefficients in the current sub-block/CU/TU/transform block/tile/tile group/CTU/CTU-row/group of CTUs/slice/picture/sequence/region block are coded with bypass bins. For example, the Golomb-Rice code may be used for coding the coefficients. If the syntax indicates that the context coded bins can be used, there is no need to count the number of context coded bins already used and no need to switch from the context coded mode to the bypass mode in the decoder or encoder. For example, the significant flag, greater than 1 flag, parity flag, greater than 2(or 3) flag can all use context coded bins.

In one embodiment, one encoder constraint can be applied for the context coded mode. A maxNumCtxBin can be derived for the sub-block/CU/TU/transform block/tile/tile group/CTU/CTU-row/group of CTUs/slice/picture/sequence/region. If the context coded mode is used for this sub-block/CU/TU/transform block/tile/tile group/CTU/CTU-row/group of CTUs/slice/picture/sequence/region, it is a bitstream conformance requirement that the used number of context coded bins cannot exceed the maxNumCtxBin. In the encoder, for a coding mode, if the number of context coded bins already used cannot exceed the maxNumCtxBin, this mode shall not be selected. In one example, the syntax can be always inferred or can be inferred when some conditions are satisfied. The coded information can be used as the conditions or used to derive the syntax value. The region can be defined as a coding node in the coding tree partition, where the corresponding area is larger than or equal to a threshold. The region definition is similar to the quantization parameter group or the root CU in the shared Merge list. For example, the region can be a leaf coding node having a corresponding area larger than or equal to a threshold, or a coding node having a corresponding area larger than or equal to a threshold and one of the child nodes having a corresponding area smaller than the threshold. In another example, the region can be a coding node having a corresponding area smaller than or equal to a threshold and the parent node of the region has a corresponding area larger than the threshold.

In one example, for the CU/TU/TB with area/width/height smaller than a threshold, the context coded mode or bypass mode is applied without signaling the syntax. For these kind of CU/TU/TB, it is a bitstream conformance requirement that the number of context coded bins already used cannot exceed the maxNumCtxBin. In one example, the syntax is coded with context coded bins. One or more contexts can be used for this context coded bin. In one embodiment, the proposed method can be applied with sub-block transform (SBT). In SBT, one or more syntaxes are signaled to indicate whether all of the coefficients of the CU/TU or half of the coefficients of the CU/TU or quarter of the coefficients of the CU/TU are coded. When the SBT is applied, the maximum value of the remaining number of context coded bins can be increased. For example, if only half of the coefficients of the CU/TU are coded, the derived maximum value of the remaining number of context coded bins can be doubled. If only quarter of the coefficients of the CU/TU are coded, the derived maximum value of the remaining number of context coded bins can be multiplied by 4. In another example, when SBT is applied, the maximum value of the remaining number of context coded bins is derived from the original TU, instead of the split TU after applying SBT.

To reduce the complexity, the high frequency coefficient zero-out can be applied for a large size CU. For example, for a 64×N or N×64 TU, only the upper-left 32×32 or 32×N or N×32 block is coded. The rest coefficients are replaced by zero. When deriving the maximum value of the remaining number of context coded bins, the TU size before or after zero out is used. For example, the 64×N or N×64 TU (TU size before zero-out) can be used to derive the maximum value of the remaining number of context coded bins, or the 32×N or N×32 TU (TU size after zero-out) can be used to derive the maximum value of the remaining number of context coded bins. When the TB width or height is larger than 32, the width or height of the region after zero-out is clipped to 32. The clipped width or height of the region after zero-out is used to derive the TB-level maximum value of the remaining number of context coded bins. In one example, the TbWidth and/or TbHeight for deriving the TU/TB/CU/PU-level maximum value of the remaining number of context coded bins can be clipped to 32 when MTS or SBT is not used, and clipped to 16 when MTS and SBT is applied. In one example, the TbWidth and/or TbHeight for deriving the TU/TB/CU/PU-level maximum value of the remaining number of context coded bins can be clipped to 32 when MTS or SBT is not used, and clipped to 16 when MTS is applied. In one embodiment, the TU/TB/CU/PU-level maximum value of the remaining number of context coded bins is derived after the TbWidth/TbHeight clipping. To improve the coding efficiency, the Intra sub-block partition (ISP) can be applied. When the Intra sub-block partition is applied, the luma CU/TU is divided into four sub-TUs. In one embodiment, when the ISP is applied, the maximum value of the remaining number of context coded bins of the whole CU or whole TU before dividing is calculated. The calculated maximum value of the remaining number of context coded bins is shared by all the ISP sub-TUs. In another embodiment, when the ISP is applied, the maximum value of the remaining number of context coded bins of each ISP sub-TU is calculated. For each sub-TU, if not all context coded bins are used, the remaining context coded bins can be used for the rest sub-TUs.

In one embodiment, the maximum value of the remaining number of context coded bins can be calculated according to the CU size/width/height, color component, coefficient sub-block sizes, whether using joint chroma residual coding, or any combination of the above. However, if the CU width or height is larger than K, e.g. 64 or maximum TU size/width/height, the K is used to calculate the maximum value of the remaining number of context coded bins.

In one embodiment, different residual coding methods can be applied according to the TU/CU size/width/height, color component, coefficient sub-block size, whether using joint chroma residual coding, or any combination of the above. For example, if the CU/TU size is larger than 4×4 or 8×8, or the area/samples number is larger than 16, 32, or 64, the above method can be applied. Otherwise, a different residual coding method is applied. For example, only the context coded bin is used to encode part of the syntaxes, e.g. significant flag only, significant flag and greater than 1 flag only, or significant flag and parity flag only. All other syntaxes are coded with bypass bins.

In one embodiment, the above proposed method can be applied for certain kind of sub-blocks/CUs/TUs/TBs/regions, e.g. for the TU with area/width/height larger than a threshold (e.g. area larger than 16, 32, or 64). For the CU/TU/TB/region not satisfied the conditions, the original coding method is applied or no context bin constraint is applied (e.g., all syntax can be coded with context coded bins). In one example, an encoder constraint is applied for these CUs/TUs/TBs/regions not satisfied the conditions. A maxNumCtxBin is derived for the sub-block/CU/TU/TB/region. It is a bitstream conformance requirement that the number of context coded bins already used cannot exceed the maxNumCtxBin for the sub-block/CU/TU/TB/region.

All or part of the above proposed methods can be applied together. All or part of the above proposed methods can be applied for a certain TU size/width/height, a certain QP or a certain profile can be specified in the picture/tile/tile group/slice/CTU/CTU-row/sequence level.

For the chroma residual joint coding, the coded block flag coding can be modified for better efficiency. For example, in TU coding, the tu_cbf_luma, tu_cbf_cb, and/or tu_cbf_cr are signaled. If the cbf of a color component is 1, the coefficients of the color component are coded. When the chroma residual joint coding is applied, the cbf coding for cb and cr can be modified as follow.

Method-1:

Code the chroma residual joint coding flag (tu_cb_cr_joint_residual) before the tu_cbf_cb and tu_cbf_cr. If the tu_cb_cr_joint_residual is 0, the tu_cbf_cb and tu_cbf_cr are signaled. If the tu_cb_cr_joint residual is 1, the tu_cbf_cb and tu_cbf_cr need not to be signaled and can be inferred as 1 and 0, respectively. However, the residual coefficient coding of the cr component is skipped.

In another example, if the tu_cb_cr_joint_residual is 1, the tu_cbf_cb is signaled. If the tu_cbf_cb is 1, the tu_cbf_cr is skipped and inferred as 1 or 0. The residual coefficient coding of the cr component is skipped. If the tu_cbf_cb is 0, the tu_cbf_cr is skipped and inferred as 0. The residual coefficient coding of the cr component is also skipped.

Method-2:

Signal the tu_cb_cr_joint_residual after tu_cbf_cb and before tu_cbf_cr. If the tu_cbf_cb is 1, the tu_cb_cr_joint_residual is signaled. If the tu_cb_cr_joint_residual is 1, the tu_cbf_cr is skipped. The residual coefficient coding of the cr component is also skipped. If the tu_cb_cr_joint_residual is 0, the tu_cbf_cr is signaled. If the tu_cbf_cb is 0, the tu_cb_cr_joint_residual is not signaled and the tu_cbf_cr is signaled.

Method-3:

Signal the tu_cb_cr_joint_residual after tu_cbf_cb and tu_cbf_cr. If the tu_cbf cb is 1 and tu_cbf_cr is 1, the tu_cb_cr_joint_residual is signaled. Otherwise (e.g. if one of the tu_cbf_cb and tu_cbf_cr is 0), the tu_cb_cr_joint_residual is not signaled. If the tu_cb_cr_joint_residual is 1, the residual coefficient coding of the cr component is also skipped.

The cr component mentioned above can be replaced by another color component (e.g. B or R or V). The cr component above can be replaced by another color component (e.g. R or B or U).

All or part of the above proposed methods can be applied together.

Any of the foregoing proposed methods can be implemented in encoders and/or decoders. For example, any of the proposed methods can be implemented in an entropy coding module of an encoder, and/or an entropy coding module of a decoder. Alternatively, any of the proposed methods can be implemented as a circuit integrated to the entropy coding module of the encoder and/or the entropy coding module of the decoder.

The foregoing proposed methods can be applied to a system using conventional scalar quantization (i.e., non-state-dependent scalar quantization) or state-dependent scalar quantization.

Figure 4:
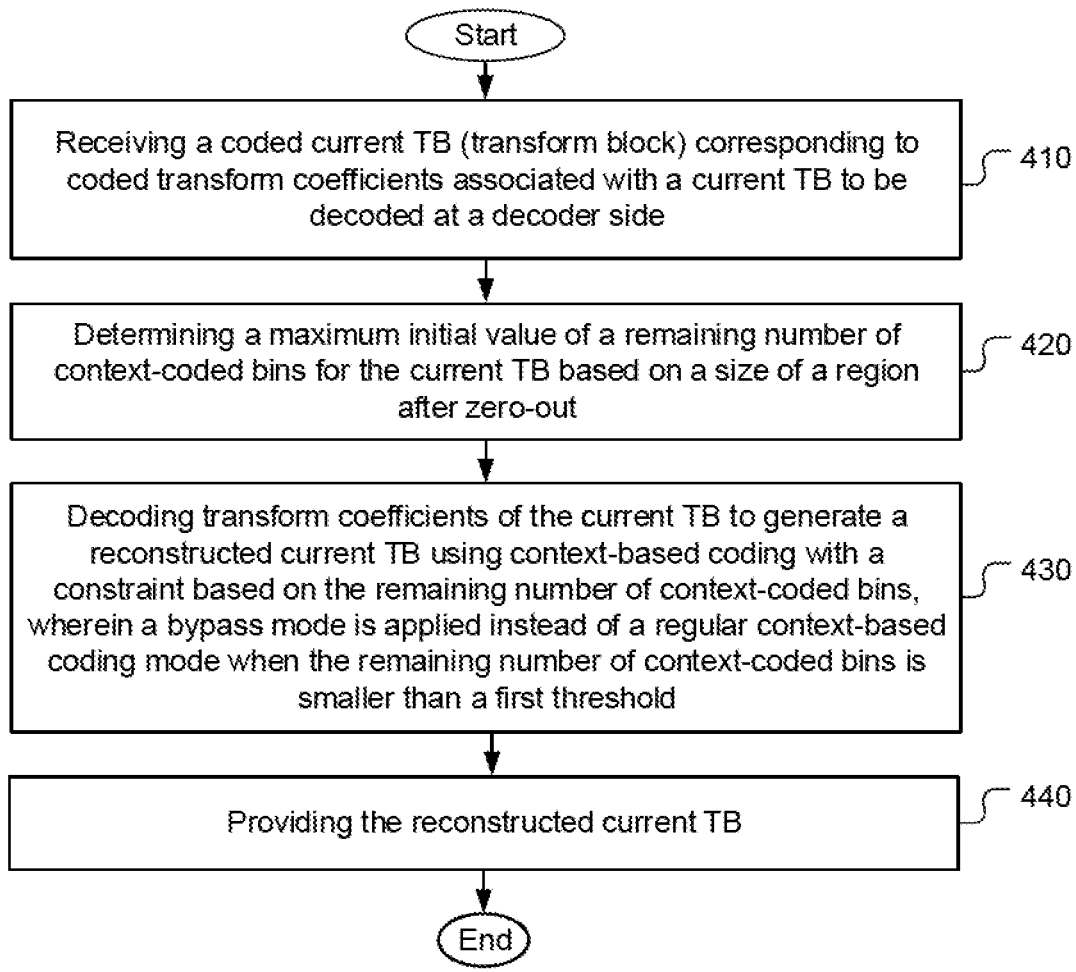
FIG. 4 illustrates a flowchart of an exemplary decoding system incorporating transform coefficient coding using context-based coding with a constraint on the remaining number of context coded bins according to an embodiment of the present invention, where the maximum value of the remaining number of context coded bins is derived based on a size of the region after zero-out.

FIG. 4 illustrates a flowchart of an exemplary decoding system according to an embodiment of the present invention, where the system incorporates a constraint on the remaining number of context-coded bins for the current TB determined based on a size of the region after zero-out. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, a coded current TB (transform block) corresponding to coded transform coefficients associated with a current TB to be decoded at a decoder side is received in step 410. A maximum value of a remaining number of context-coded bins is determined initially for the current TB based on a size of a region after zero-out in step 420. Transform coefficients of the current TB are decoded to generate a reconstructed current TB using context-based coding with a constraint based on the remaining number of context-coded bins in step 430, where a bypass mode is applied instead of a regular context-based coding mode when the remaining number of context-coded bins is smaller than a first threshold. The reconstructed current TB is then provided in step 440.

Figure 5:
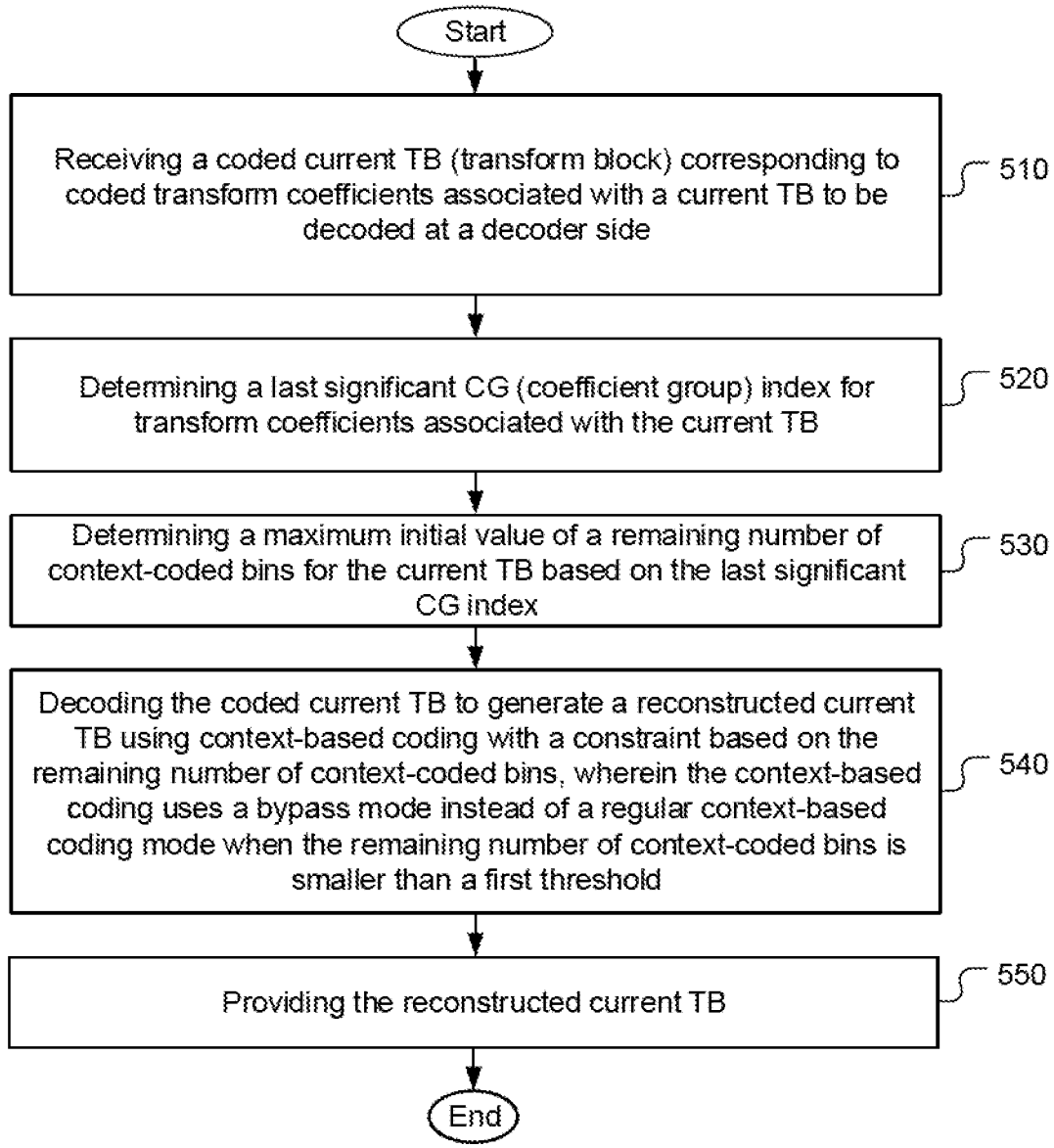
FIG. 5 illustrates a flowchart of an exemplary decoding system incorporating transform coefficient coding using context-based coding with constraint on the remaining number of context coded bins according to an embodiment of the present invention, where the maximum value of the remaining number of context coded bins is derived based on the last significant CG index.

FIG. 5 illustrates a flowchart of another exemplary decoding system according to an embodiment of the present invention, where the system incorporates a constraint on the maximum number of context-coded bins for the current TB determined based on the last significant CG index. According to this method, a coded current TB (transform block) corresponding to coded transform coefficients associated with a current TB to be decoded at a decoder sideis received in step 510. A last significant CG (Coefficient Group) index is determined for transform coefficients associated with the current TB in step 520. A maximum value of a remaining number of context-coded bins is determined initially for the current TB based on the last significant CG index in step 530. The coded current TB is decoded to generate a reconstructed current TB using context-based coding with a constraint based on the remaining number of context-coded bins in step 540, wherein the context-based coding uses a bypass mode instead of a regular context-based coding mode when the remaining number of context-coded bins is smaller than a first threshold. The reconstructed current TB is provided in step 550.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for encoding prediction residues in a video coding system, the method comprising:
receiving input data corresponding to transform coefficients associated with a current transformed block (TB) to be coded at an encoder side;
determining initially a maximum allowed number of context-coded bins of one or more coefficient level related syntax elements for the current TB based on a size of a region after zero-out, wherein a width or height of the region after zero-out is clipped to a pre-defined value before said determining initially the maximum allowed number, wherein the pre-defined value corresponds to 32, wherein the pre-defined value corresponds to 16 if MTS (multiple transform set) is enabled and the SBT (sub-block transform) is applied to the current TB, wherein dependency of determining initially the maximum allowed number comprises an area of the region after zero-out, wherein the dependency of said determining initially the maximum allowed number comprises the area of the region after zero-out multiplied by a factor equal to 1.75;

tracking each time a transform coefficient of the current TB is encoded using context-based coding;

based on the maximum allowed number being reached, switching to bypass mode for transform level syntax coding for all remaining coefficients of a currently processed sub-block of the TB, and all remaining sub-blocks of the TB; and providing the coded current TB.

2. The method of claim 1, wherein a target transform coefficient of the current TB outside the region after zero-out is not coded.

3. The method of claim 1, wherein the pre-defined value corresponds to 16 if MTS (multiple transform set) and a sub-block transform is allowed for a current block containing the current TB.

4. A method for decoding prediction residues in a video coding system, the method comprising: receiving a coded current TB (transform block) corresponding to coded transform coefficients associated with a current TB to be decoded at a decoder side; determining initially a maximum allowed number of context-coded bins of one or more coefficient level related syntax elements for the current TB based on a size of a region after zero-out, wherein a width or height of the region after zero-out is clipped to a pre-defined value before said determining initially the maximum allowed number, wherein the pre-defined value corresponds to 32, wherein the pre-defined value corresponds to 16 if MTS (multiple transform set) is allowed for the current TB, wherein dependency of determining initially the maximum allowed number comprises an area of the region after zero-out, wherein the dependency of said determining initially the maximum allowed number comprises the area of the region after zero-out multiplied by a factor equal to 1.75; tracking each time a transform coefficient of the current TB is decoded to generate a reconstructed current TB using context-based coding; based on the maximum allowed number being reached, switching to bypass mode for transform level syntax coding for all remaining coefficients of a currently processed sub-block of the TB, and all remaining sub-blocks of the TB; and providing the reconstructed current TB.

5. The method of claim 4, wherein a target transform coefficient of the current TB outside the region after zero-out is not parsed.

6. The method of claim 4, wherein the pre-defined value corresponds to 16 if MTS (multiple transform set) and a sub-block transform is allowed for a current block containing the current TB.

7. The method of claim 4, wherein the dependency of said determining the maximum allowed number further comprises the area of the region after zero-out and then right-shifted by 2.

8. The method of claim 7, wherein the factor can be different for luma TB and chroma TB.

9. An apparatus for decoding prediction residues in a video coding system, the apparatus comprising one or more electronic circuits or processors arranged to:

receive a coded current TB (transform block) corresponding to coded transform coefficients associated with a current TB to be decoded at a decoder side;

determine initially a maximum allowed number of context-coded bins of one or more coefficient level related syntax elements for the current TB based on a size of a region after zero-out, wherein a width or height of the region after zero-out is clipped to a pre-predefined value before said determining initially the maximum allowed number, wherein the pre-defined value corresponds to 32, wherein the pre-defined value corresponds to 16 if MTS (multiple transform set) is enabled and the SBT (sub-block transform) is applied to the current TB, wherein dependency of determining initially the maximum allowed number comprises an area of the region after zero-out, wherein the dependency of said determining initially the maximum allowed number comprises the area of the region after zero-out multiplied by a factor equal to 1.75;

track each time a transform coefficient of the current TB is decoded to generate a reconstructed current TB using context-based coding;

based on the maximum allowed number being reached, switch to bypass mode for transform level syntax coding for all remaining coefficients of a currently processed sub-block of the TB, and all remaining sub-blocks of the TB; and provide the reconstructed current TB.

* * * * *